(12) United States Patent
Ackermanns et al.

(10) Patent No.: US 7,648,632 B2
(45) Date of Patent: *Jan. 19, 2010

(54) DEVICE FOR RECEIVING AND SEPARATING CHIPS AND COOLING LIQUID COLLECTION ON MACHINE TOOLS (OVERFLOW)

(75) Inventors: Leo J. P. Ackermanns, Schin op Geul (NL); Wiel E. H. Kroonen, Bocholtz (NL); Joseph H. van Loo, Hoensbroek (NL)

(73) Assignee: Mayfran International B.V., Landgraaf (NL)

( * ) Notice: Subject to any disclaimer, the term of this patent is extended or adjusted under 35 U.S.C. 154(b) by 356 days.

This patent is subject to a terminal disclaimer.

(21) Appl. No.: 11/333,020

(22) Filed: Jan. 17, 2006

(65) Prior Publication Data
US 2006/0113238 A1 Jun. 1, 2006

Related U.S. Application Data

(63) Continuation of application No. 10/492,485, filed on Apr. 9, 2004, now Pat. No. 7,014,760.

(51) Int. Cl.
*B23Q 11/00* (2006.01)
*B01D 36/02* (2006.01)
*B01D 36/04* (2006.01)
*B01D 29/05* (2006.01)
*B01D 33/073* (2006.01)

(52) U.S. Cl. .............. 210/248; 210/297; 210/298; 210/323.1; 210/402

(58) Field of Classification Search ............... 210/248, 210/297, 298, 323.1, 402
See application file for complete search history.

(56) References Cited

U.S. PATENT DOCUMENTS 5,167,839 A * 12/1992 Widmer et al. ............. 210/784

(Continued)

FOREIGN PATENT DOCUMENTS

DE 296 09 685 U1 8/1996

(Continued)

OTHER PUBLICATIONS

International Search Report PCT/EP 03/05243, dated Sep. 3, 2003.

*Primary Examiner*—Thomas M Lithgow
(74) *Attorney, Agent, or Firm*—Calfee, Halter & Griswold LLP

(57) ABSTRACT

A device is disclosed for receiving and separating chips and coolant collecting on machine tools in which unfiltered coolant is prevented from penetrating tanks for filtered coolant in the event a receiving tank overflows. This is achieved in that holders, whose projecting ends, which are directed downward, extend into an overflow channel, are tightly attached externally to the wall of the receiving tank. The overflow channel is guided around the device at a level below the top edge of the receiving tank and is removably held on the holders. The overflow channel tightly covers tanks located beneath it having filtered coolant. The inner edge of the overflow channel neighboring the receiving tank lies at a higher level than the outer edge of the overflow channel, which is further away from the receiving tank, and at least one outlet device is provided in the bottom region of the overflow channel.

20 Claims, 4 Drawing Sheets

U.S. PATENT DOCUMENTS

Figure 1:
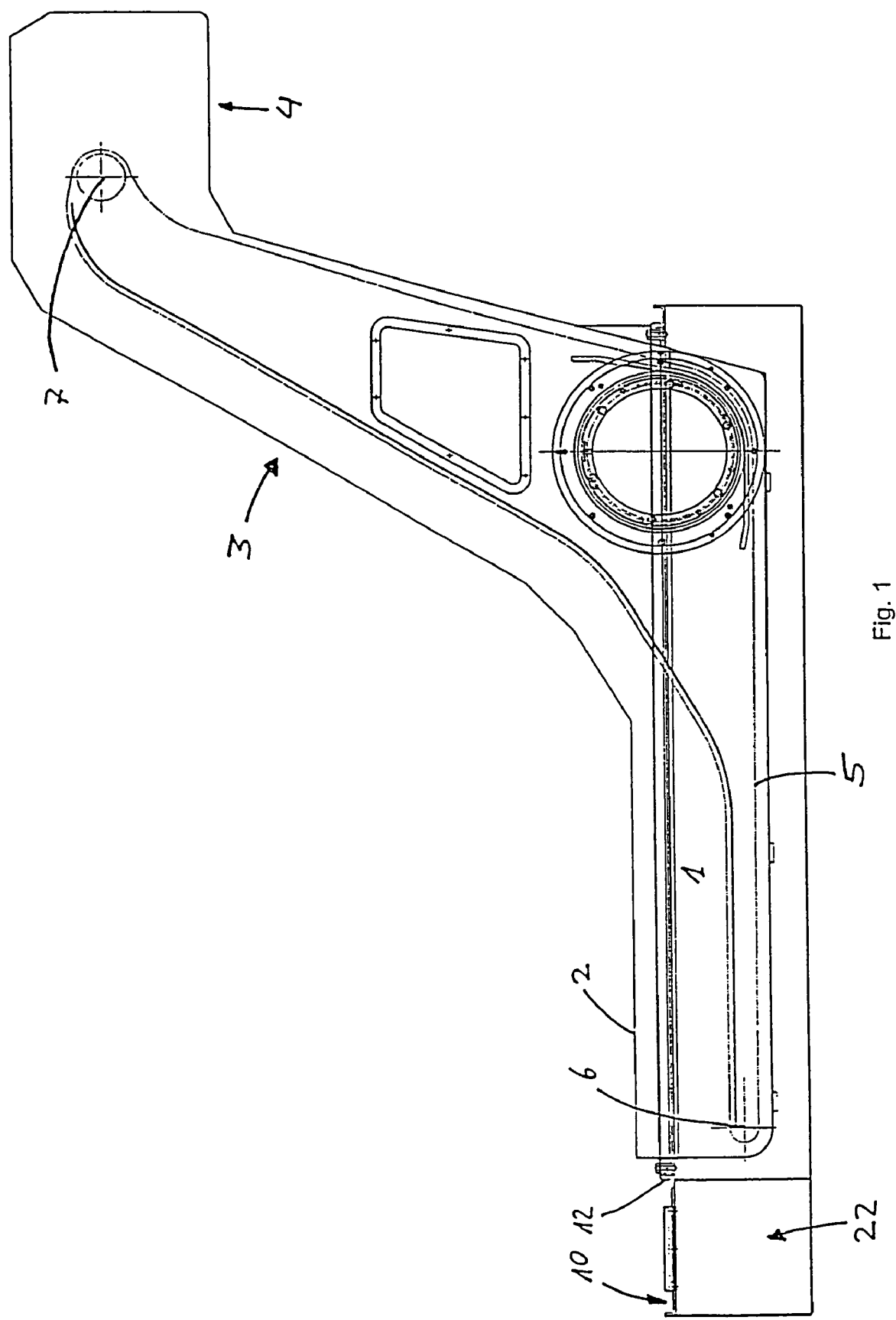

| | | | |
|---|---|---|---|
| 5,603,846 A * | 2/1997 | Uchiyama et al. | 210/784 |
| 6,017,446 A | 1/2000 | Harms et al. | |
| 6,332,983 B1 * | 12/2001 | Tashiro et al. | 210/297 |
| 7,014,760 B2 * | 3/2006 | Ackermanns et al. | 210/248 |

FOREIGN PATENT DOCUMENTS

| | | |
|---|---|---|
| EP | 1 053 825 A2 | 11/2000 |
| EP | 1 177 854 A1 | 2/2002 |
| JP | 63-245350 A * | 10/1988 |

* cited by examiner

Section A-A

Section B-B

DEVICE FOR RECEIVING AND SEPARATING CHIPS AND COOLING LIQUID COLLECTION ON MACHINE TOOLS (OVERFLOW)

RELATED APPLICATIONS

This Application is a continuation application of U.S. patent application Ser. No. 10/492,485, filed Apr. 9, 2004 now U.S. Pat. No. 7,014,760.

DESCRIPTION

The present invention relates to a device for receiving and separating chips and coolant collecting on machine tools, the coolant being returned for reuse and the chips being removed, having a receiving tank to receive the chips and the coolant, a rising guide section adjoining the receiving tank, an elevated discharge section adjoining the guide section, a chain-like closed transport element, which, at least in the region receiving the chips and the coolant and in the discharge section, is guided over deflection elements, at least one of which is coupled to a rotary drive, and a rotatably mounted filter drum, which is in drive connection with the transport element.

During the transport of chips and coolant, blockages of the transport paths may not be completely prevented. In addition, the occurrence of the chips and the coolant may be distributed greatly irregularly over time. In turn, a backup of the coolant in the device and therefore also a rise of the coolant may result from this, which may, in the most unfavorable case, have an overflow of the unpurified coolant over the upper edge of the receiving tank as a consequence. Such an overflow may then reach regions which are to be kept clean and containers containing coolant which has already been purified.

The object of the present invention is therefore, in case of such an overflow, to prevent the contamination of regions to be kept clean and of tanks containing coolant which has already been purified and, in addition, to make the overflow situation visually recognizable to the operating personnel.

This object is achieved by a device of the type initially described according to the present invention in that holders, whose projecting ends, which are directed downward, extend into an overflow channel, are tightly attached externally to the wall of the receiving tank; the overflow channel is guided around the device at a level below the upper edge of the receiving tank and is removably held on the holders, the overflow channel tightly covers tanks located beneath it having filtered coolant, the inner edge of the overflow channel neighboring the receiving tank lies at a higher level than outer edge of the overflow channel, which is further away from the receiving tank, and at least one outlet device is provided in the bottom region of the overflow channel.

The overflow channel has a storage volume which may accommodate overflowing contaminated coolant for some time. If this storage volume is not sufficient, an overflow occurs at the outer edge of the channel. The purified coolant located below the channel is protected from recontamination.

According to a further suggestion of the present invention, the overflow channel may be implemented as U-shaped.

According to a further suggestion of the present invention, the outlet device may have a screen which is fixed on the edge of an opening in the bottom of the overflow channel. The filter properties of the screen expediently correspond to those of the filter cloth which is used on the filter drum. In this way, it is ensured that the coolant which passes through the outlet device into a container having purified coolant is of the same degree of purity as the coolant located there, i.e., contamination is avoided.

According to a further suggestion of the present invention, a cover is provided over the screen which leaves the flow to the screen free and which may be stepped on. Therefore, the overflow channel is passable and the screen is protected from stresses which are too high.

Finally, according to a further suggestion of the present invention, the maximum pass-through volume flow of the outlet device(s) may be smaller than or equal to the maximum overflow volume flow.

In the following, an embodiment of the device according to the present invention is described with reference to the drawings.

Figure 2:
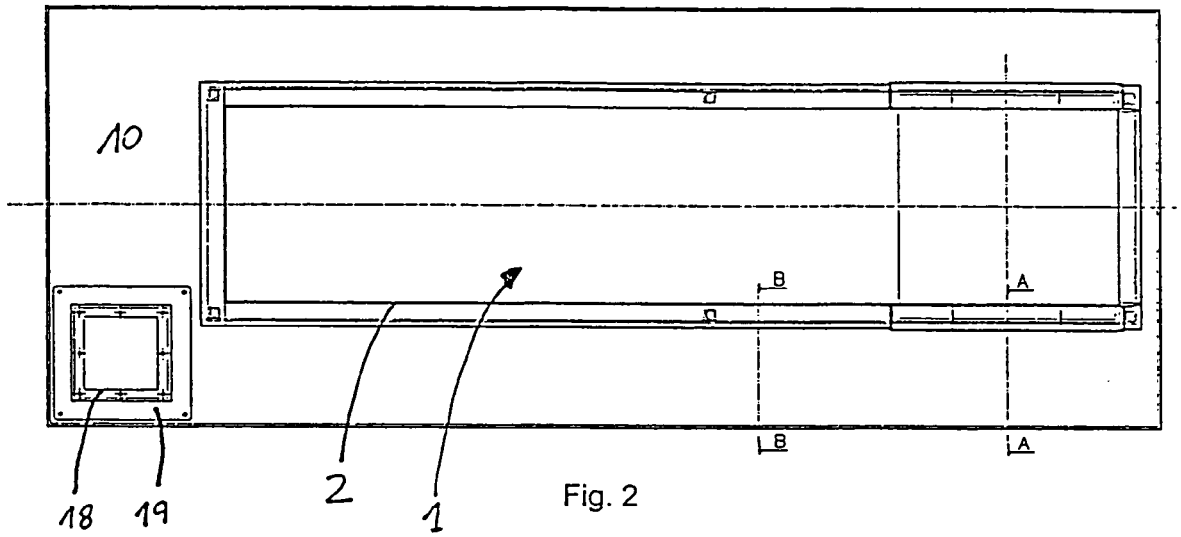
Figure 2A:
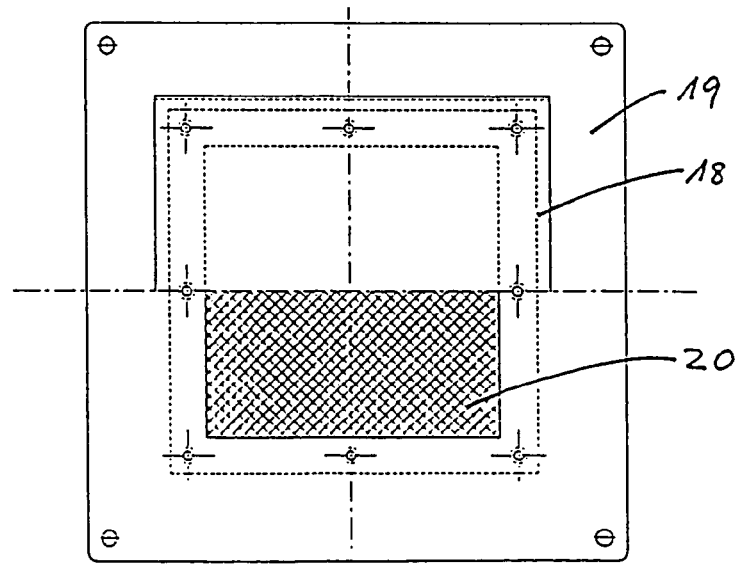
Figure 2B:
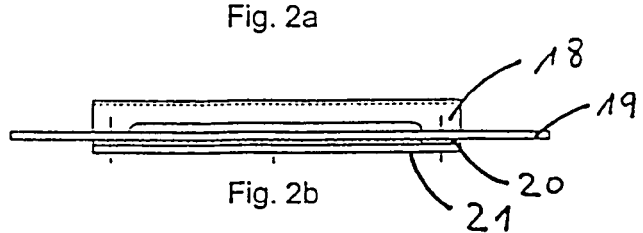
Figure 3:
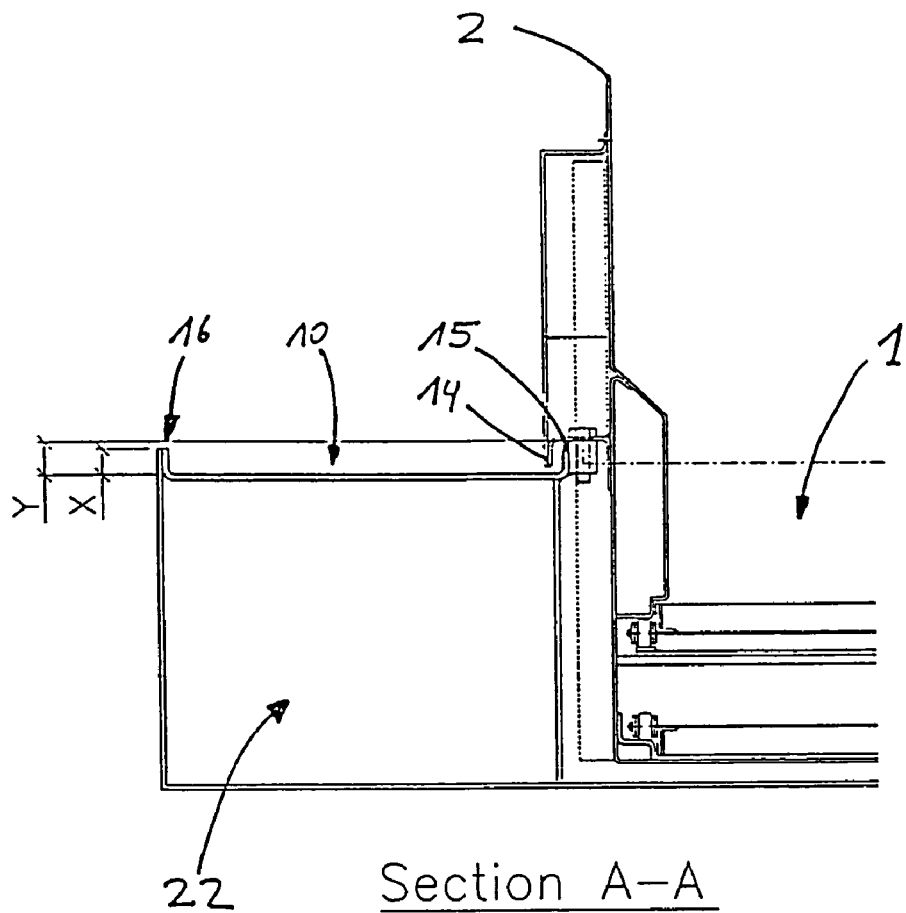
Figure 4:
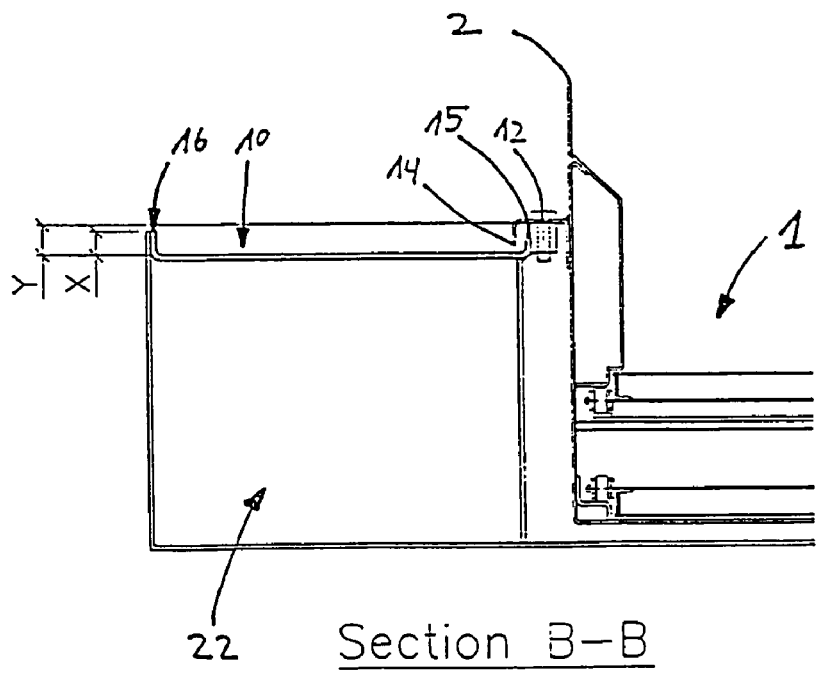

FIG. 1: shows a side view of a device according to the present invention having an overflow channel, FIG. 2: shows a top view of the overflow channel shown in FIG. 1, FIG. 2a: shows a top view of the outlet device, FIG. 2b: shows a section through the outlet device shown in FIG. 2a, FIG. 3: shows a section along line A/A in FIG. 2, and FIG. 4: shows a section along line B/B in FIG. 2.

Figure 5:
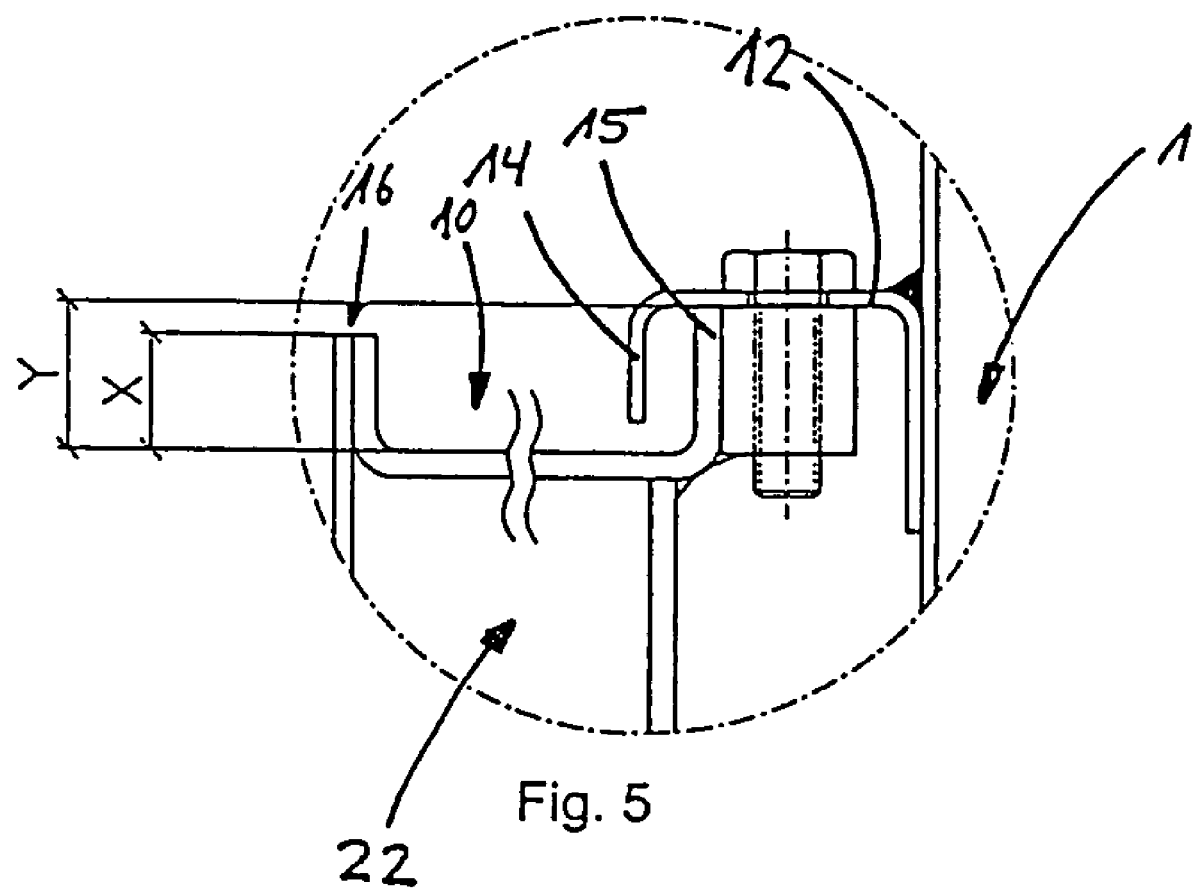

FIG. 5: shows a detail view of the connection between receiving tank and overflow channel.

FIG. 1 shows the side view of an embodiment of the device according to the present invention having a receiving tank 1, which is open on top and receives the chips and coolant collecting on the machine tools. This receiving tank has an overflow edge 2. A rising guide section 3, which transits into an elevated discharge section 4, adjoins the receiving tank. A hinged belt conveyor 5, guided on both sides via rollers, is provided here as a transport element for transporting away the chips present in the coolant. This conveyor is guided around a lower deflection element 6 on the end of receiving tank 1 and runs around an upper deflection element 7, which is coupled to a drive, not shown, in the region of discharge section 4.

The top view of the device is schematically illustrated in FIG. 2, an overflow channel 10 surrounding the entire device. Tanks 22 for receiving purified coolant may be located below overflow channel 10.

FIG. 2a shows an aspect of an outlet device 17, which is inserted into an opening in overflow channel 10. Outlet device 17 includes a retaining plate 19, to which screen 20 and cover 18 are attached. In this case, the filter properties of screen 20 correspond to those of the filter drum. If unfiltered coolant now passes over overflow edge 2 into overflow channel 10, it will reach outlet device 17. The coolant will then run off through screen 20 into tanks 22 located below overflow channel 10, the chips still contained in the coolant being held back by screen 20, so that only filtered coolant reaches tanks 22 located underneath overflow channel 10. Cover 18 has a recess on each of its sides, through which the unfiltered coolant may flow to screen 20, and is used as a foot board.

FIG. 2b shows a section through outlet device 17. It includes retaining plate 19, to the top of which cover 18 is attached. Screen 20 is held on the bottom of retaining plate 19 with the aid of screen attachment frame 21.

FIG. 3 shows a section through the device along line A-A, which runs through rising guide section 3 of the device. In this section, overflow of receiving tank 1 will not occur. Nonetheless, it has been shown to be advantageous to lead overflow channel 10 around the entire device.

FIG. 4 shows a section through the device along line B-B, which runs through receiving tank 1. In this case, top edge 2 of receiving container 1 is simultaneously the lowest edge of receiving tank 1. Therefore, if an overflow of coolant which is not yet been purified occurs, it will occur in this region. Overflowing coolant will then flow on the outside of receiving tank 1 and over the upside-down U-shaped profile into overflow channel 10. Subsequently, it will flow off into tank 22 via outlet device 17, chips contained therein being held back by screen 20. For the case in which the quantity of overflowing coolant is greater than that flowing off through the outlet device, the coolant will first collect in overflow channel 10 and finally flow off over outer leg 16 of overflow channel 10, which has a lower height than inner leg 15 of overflow channel 10, so that in this way it is ensured that unfiltered coolant will not reach tank 22 having filtered coolant in any case.

FIG. 5 shows a detailed view of the connection between receiving tank 1 and overflow channel 10. Holders 12 are welded into the outer wall of receiving tank 1. In the exemplary embodiment, the holders are a upside-down U-shaped profile, whose one leg is welded onto the outer wall of receiving tank 1 and whose outer leg 14 engages in overflow channel 10. Receiving tank 1 is connected to overflow channel 10 using a screw connection via the upside-down U-shaped profile welded onto it. The overflow channel has an inner leg 15 facing the device and an outer leg 16 facing away from the device, height x of the outer leg 16 being selected lower than height y of inner leg 15. This has the consequence that when overflow channel 10 is filled, overflow occurs outward before the filling state possible here is achieved on inner leg 15 of overflow channel 10. Therefore, a seal is not necessary between outer leg 14 of upside-down U-shaped profile 12 and inner leg 15 of U-shaped overflow channel 10.

While the present invention has been illustrated by the above description of embodiments, and while the embodiments have been described in some detail, it is not the intention of the applicants to restrict or in any way limit the scope of the invention to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departing from the spirit or scope of the applicants' general or inventive concept.

LIST OF REFERENCE NUMBERS 1 receiving tank
2 overflow edge
3 guide section
4 discharge section
5 hinged belt conveyor
6 lower deflection element
7 upper deflection element
8 -
9 -
10 overflow channel
11 -
upside-down U-profile
13 -
14 outer leg of upside-down U-profile
15 inner leg of overflow channel
16 outer leg of overflow channel
17 outlet device
18 cover
19 retaining plate
20 screen
21 screen attachment frame
22 tank for filtered coolant

The invention claimed is:

1. A device for receiving and separating chips and fluid collecting on machine tools, comprising:
   a. a receiving tank to receive the chips and fluid;
   b. an overflow channel having an inner edge and an outer edge, the overflow channel connected to and around at least a portion of the receiving tank; and
   c. at least one holder having at least two downwardly projecting ends, one end attached to a wall of the receiving tank, and the other end extending into the overflow channel, wherein the overflow channel has a storage volume capable of accommodating fluid overflowing from the receiving tank.

2. The device of claim 1 wherein the holder is welded to the wall of the receiving tank.

3. The device of claim 1, wherein the overflow channel is removably held by the at least one holder.

4. The device of claim 1, wherein the overflow channel is at a level below that of an upper edge of the receiving tank.

5. The device of claim 1, wherein the overflow channel is substantially U-shaped.

6. A device for receiving and separating chips and fluid collecting on machine tools, comprising:
   a. a receiving tank to receive the chips and fluid; and
   b. an overflow channel having an inner edge and an outer edge, the overflow channel connected to and around at least a portion of the receiving tank;
   wherein the overflow channel has a storage volume capable of accommodating fluid overflowing from the receiving tank and, wherein the overflow channel tightly covers tanks having filtered coolant.

7. A device for receiving and separating chips and fluid collecting on machine tools, comprising:
   a. a receiving tank to receive the chips and fluid; and
   b. an overflow channel having an inner edge and an outer edge, the overflow channel connected to and around at least a portion of the receiving tank;
   wherein the overflow channel has a storage volume capable of accommodating fluid overflowing from the receiving tank and, wherein the inner edge of the overflow channel is at a higher level than the outer edge of the overflow channel.

8. The device of claim 6, wherein the overflow channel comprises at least one outlet device.

9. A device for receiving and separating chips and fluid collecting on machine tools, comprising:
   a. a receiving tank to receive the chips and fluid; and
   b. an overflow channel having an inner edge, an outer edge, and at least one outlet device, the overflow channel connected to and around at least a portion of the receiving tank;
   wherein the overflow channel has a storage volume capable of accommodating fluid overflowing from the receiving tank and, wherein the outlet device comprises a filter.

10. The device of claim 9, wherein the filter comprises a screen.

11. A device for receiving and separating chips and fluid collecting on machine tools, comprising:
   a. a receiving tank to receive the chips and fluid;
   b. an overflow channel having an inner edge, an outer edge, and at least one outlet device, the overflow channel connected to and around at least a portion of the receiving tank; and
   c. a cover configured to cover the outlet device and further configured to be stepped on, wherein the overflow channel has a storage volume capable of accommodating fluid overflowing from the receiving tank.

12. The device of claim 9, further comprising a filter drum.

13. A device for receiving and separating chips and fluid collecting on machine tools, comprising:
   a. a receiving tank to receive the chips and fluid;
   b. an overflow channel having an inner edge, an outer edge, and an outlet device with a filter, the overflow channel connected to and around at least a portion of the receiving tank; and
   c. a filter drum;
   wherein the overflow channel has a storage volume capable of accommodating fluid overflowing from the receiving tank.

14. The device of claim 13, wherein the filter properties of the filter correspond to those of the filter drum.

15. The device of claim 1, wherein the overflow channel comprises at least one outlet device.

16. The device of claim 7, wherein the overflow channel comprises at least one outlet device.

17. The device of claim 9 wherein the overflow channel is removably held by at least one holder.

18. The device of claim 17 wherein the at least one holder is welded to the wall of the receiving tank.

19. The device of claim 6 further comprising at least one holder having at least two downwardly projecting ends, one end attached to a wall of the receiving tank, and the other end extending into the overflow channel.

20. The device of claim 6 wherein the inner edge of the overflow channel is at a higher level than the outer edge of the overflow channel.

* * * * *

UNITED STATES PATENT AND TRADEMARK OFFICE
CERTIFICATE OF CORRECTION

PATENT NO. : 7,648,632 B2
APPLICATION NO. : 11/333020
DATED : January 19, 2010
INVENTOR(S) : Leo J. P. Ackermanns, Wiel E. H. Kroonen and Joseph H. van Loo It is certified that error appears in the above-identified patent and that said Letters Patent is hereby corrected as shown below:

On the title of the patent, Item (63) Related U.S. Application Data, after "7,014,760" please add "which is a 371 of PCT/EP03/05243 filed on May 19, 2003".

Title page add Item (30), Foreign Application Priority Data:
"May 24, 2002 (DE) 10223291".

Signed and Sealed this

Ninth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,648,632 B2
APPLICATION NO. : 11/333020
DATED : January 19, 2010
INVENTOR(S) : Ackermanns et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 723 days.

Signed and Sealed this

Twenty-third Day of November, 2010

David J. Kappos
*Director of the United States Patent and Trademark Office*